(12) United States Patent
Bao et al.

(10) Patent No.: US 12,113,407 B2
(45) Date of Patent: Oct. 8, 2024

(54) MOTOR AND ELECTRIC DEVICE COMPRISING SUCH MOTOR

(71) Applicant: GENTHERM GMBH, Odelzhausen (DE)

(72) Inventors: Bob Bao, Suzhou (CN); Loory Wang, Shanghai (CN)

(73) Assignee: GENTHERM GMBH, Odelzhausen (DE)

( * ) Notice: Subject to any disclaimer, the term of this patent is extended or adjusted under 35 U.S.C. 154(b) by 240 days.

(21) Appl. No.: 17/607,112

(22) PCT Filed: Jul. 13, 2020

(86) PCT No.: PCT/CN2020/101620
§ 371 (c)(1),
(2) Date: Oct. 28, 2021

(87) PCT Pub. No.: WO2021/004545
PCT Pub. Date: Jan. 14, 2021

(65) Prior Publication Data
US 2022/0209632 A1    Jun. 30, 2022

(30) Foreign Application Priority Data

Jul. 11, 2019    (CN) .......................... 201910623277.2

(51) Int. Cl.
| H02K 11/40 | (2016.01) |
| F04D 25/08 | (2006.01) |
| H02K 1/12 | (2006.01) |
| H02K 11/33 | (2016.01) |

(52) U.S. Cl.
CPC ............. *H02K 11/40* (2016.01); *F04D 25/08* (2013.01); *H02K 1/12* (2013.01); *H02K 11/33* (2016.01)

(58) Field of Classification Search
CPC .......... H02K 1/12; H02K 11/33; H02K 11/40; F04D 25/08
USPC ........................................................ 310/40 R
See application file for complete search history.

(56) References Cited

U.S. PATENT DOCUMENTS 5,697,501 A  * 12/1997  Johansen ................ H01L 23/60
                                                                206/719
2006/0220474 A1   10/2006  Yoshida
2015/0123501 A1    5/2015  Jang et al.

FOREIGN PATENT DOCUMENTS

| CN | 1825735 A | 8/2006 |
| CN | 201160251 Y | * 12/2008 |
| CN | 101572459 A | 11/2009 |
| CN | 101588100 A | 11/2009 |
| CN | 203554247 U | 4/2014 |
| CN | 104836386 A | 8/2015 |

(Continued)

OTHER PUBLICATIONS

English translation of JP-H0666275-U, accessed Dec. 1, 2023 via USPTO Search tool (Year: 1994).*

(Continued)

*Primary Examiner* — Jeremy A Luks
(74) *Attorney, Agent, or Firm* — The Dobrusin Law Firm, P.C.

(57) ABSTRACT

A motor that includes a stator having a stator core; a rotor; and a ground pin for at least achieving a ground connection of the stator core; the ground pin is configured to be electrically connected to the stator core by being partially embedded in the stator core.

19 Claims, 4 Drawing Sheets

(56) References Cited

FOREIGN PATENT DOCUMENTS

| CN | 207732580 U | | 8/2018 | | |
|---|---|---|---|---|---|
| CN | 207819684 U | | 9/2018 | | |
| CN | 207819686 U | | 9/2018 | | |
| CN | 208190467 U | | 12/2018 | | |
| EP | 3051637 A1 | * | 8/2016 | ............. | H01R 39/32 |
| JP | H0666275 U | * | 9/1994 | | |
| JP | H0787696 A | | 3/1995 | | |
| JP | 2012249404 A | | 12/2012 | | |

OTHER PUBLICATIONS

International Search Report and Written Opinion dated Sep. 29, 2021, for International Application PCT/CN2020/101620.
Chinese First Search, CN Application No. 201910623277.2, dated Dec. 26, 2022.
Chinese Office Action, CN Application No. 201910623277.2, dated Dec. 26, 2022.
Chinese Second Office Action, CN Application No. 201910623277.2, dated Jul. 25, 2023.

\* cited by examiner

MOTOR AND ELECTRIC DEVICE COMPRISING SUCH MOTOR

PRIORITY

This application is a National Stage Entry of PCT/CN2020/101620 filed on Jul. 13, 2020, which claims priority to CN 201910623277.2 filed on Jul. 11, 2019, all of which are expressly incorporated by reference herein for all purposes.

TECHNICAL FIELD

The present invention relates to a motor and an electric device, in particular a blower, comprising such a motor.

BACKGROUND ART

Motors have a number of advantages, such as being easy to be controlled and simply structured, and thus are widely applied in many fields, for example, in blowers.

However, as an electromagnetic device for converting or transferring electrical energy based on laws of electromagnetic induction, motors have to face the problem of electromagnetic compatibility. Electromagnetic compatibility refers to the capability of a device or system of operating as required in an electromagnetic environment and at the same time not generating unbearable electromagnetic disturbances to any of the devices in its surroundings.

Exactly out of consideration for electromagnetic compatibility, the stator of a motor has to be grounded, for example, be connected to an electrically conductive housing. Currently, however, the stator of a motor, in particular of a motor in a blower, is grounded mainly by using wire welding. This type of grounding easily fails due to reasons such as violent vibrations caused by the motor operation, and it is also disadvantageous to the assembly of the motor.

As a result, there is a need to further solve the stator grounding problem of the existing motors.

SUMMARY OF THE INVENTION

The object of this invention is to provide an improved motor and an electric device, in particular a blower, comprising such a motor.

Therefore, according to a first aspect of the present invention, a motor is provided, comprising: a stator comprising a stator core; a rotor; and a ground pin for at least achieving a ground connection of the stator core, wherein the ground pin is configured to be electrically connected to the stator core by being partially embedded in the stator core.

According to a second aspect of the present invention, an electric device, in particular a blower, comprising such a motor is provided.

According to the present invention, ground connection can be realized in a simple and reliable manner, and the assembling process is greatly simplified.

BRIEF DESCRIPTION OF THE DRAWINGS

The present invention will be described in greater detail with reference to the accompanying drawings, which leads to a better understanding of the principles, characteristics and advantages of the present invention. The drawings are as follows.

DETAILED DESCRIPTION OF EMBODIMENTS

For a clearer understanding of the technical problem to be solved, the technical solutions and the advantageous technical effects of the present invention, the invention will be further described in details in combination with drawings and a number of exemplary embodiments. It is to be understood that the specific embodiments described herein are merely for explaining the present invention, rather than limiting the scope of the present invention.

Figure 1:
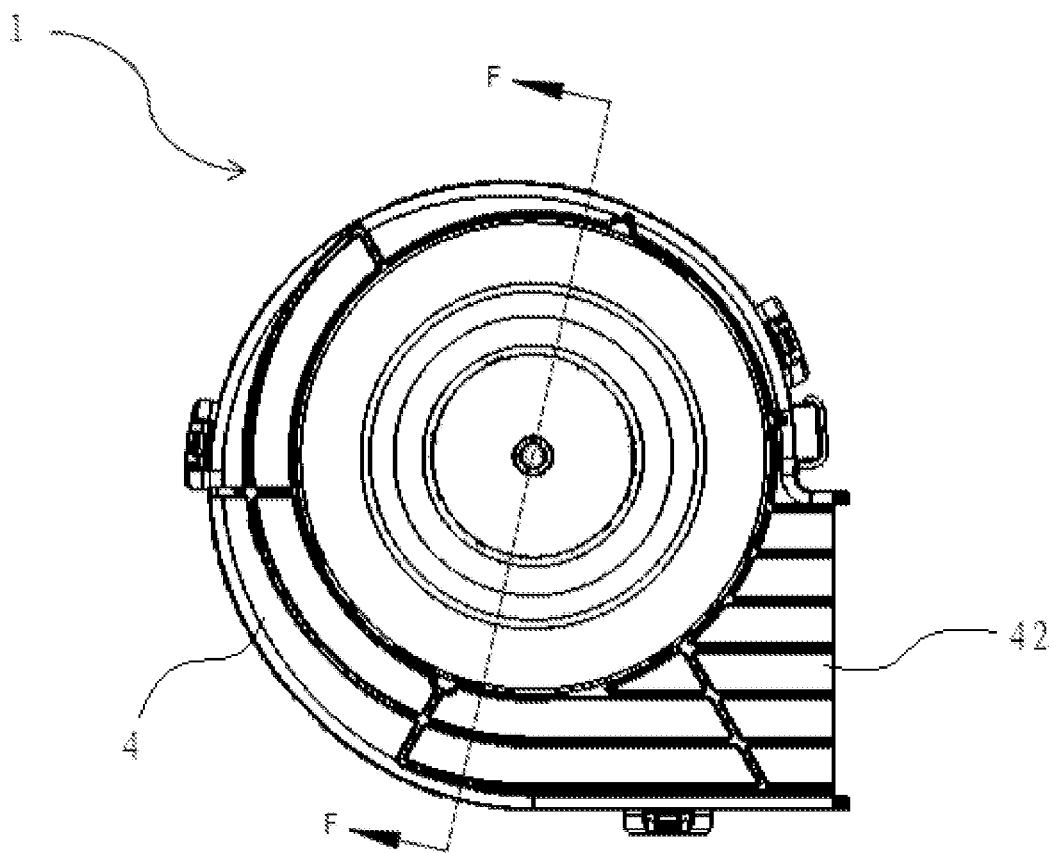
FIG. 1 shows a blower according to one exemplary embodiment of the present invention.
Figure 2:
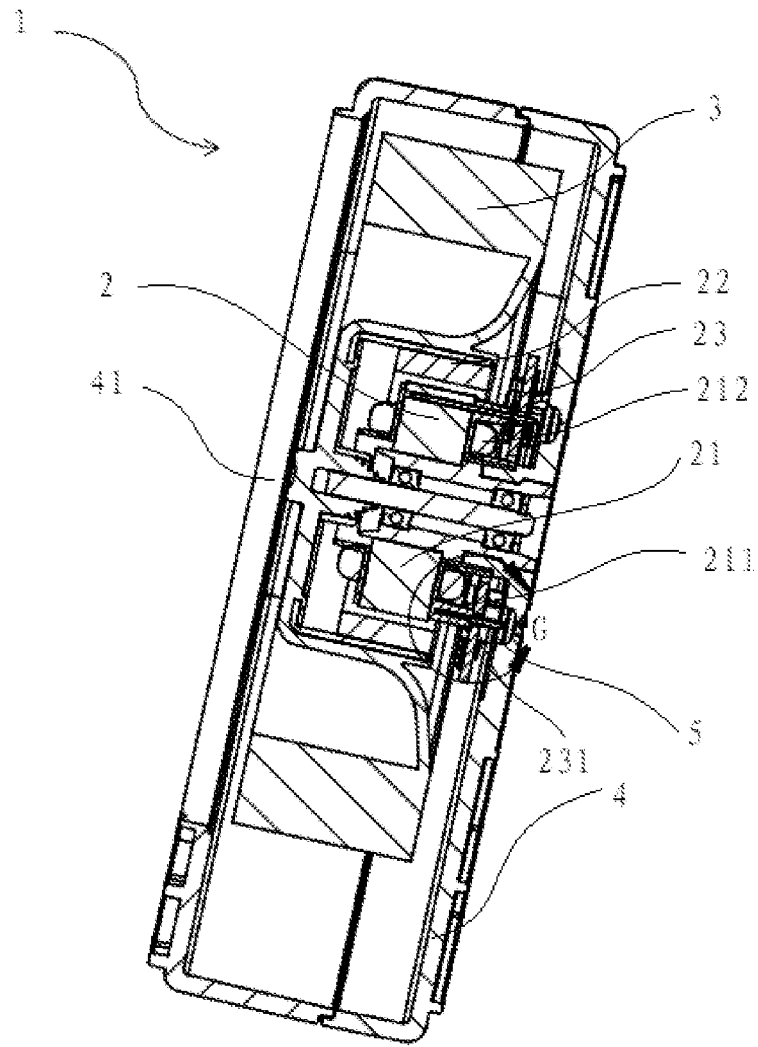
FIG. 2 shows a sectional view taken along a line F-F of FIG. 1.

FIG. 1 shows a blower 1 according one exemplary embodiment of the present invention, and FIG. 2 shows a sectional view taken along a line F-F of FIG. 1.

As shown in FIG. 1 and FIG. 2, the blower 1 mainly comprises a motor 2 as a driving device, an impeller 3 driven by the motor 2, and a housing 4, wherein the housing 4 is used for at least partially covering the motor 2 and the impeller 3 and is provided with an air inlet 41 and an air outlet 42, wherein air is sucked in through the air inlet 41 and compressed by the rotating impeller 3 and then discharged from the air outlet 42; meanwhile, the housing 4 is at least partially made of metal so as to be provided with grounding properties for a circuit as well.

As shown in FIG. 2, the motor 2 mainly comprises a stator 21, a rotor 22 that may be a magnet, and a control device 23 preferably as a printed circuit board assembly (PCBA). The stator 21 comprises a stator core 211 and a coil 212 wound around the stator core 211. The rotor 22 is connected to the impeller 3 to drive the impeller 3 into rotation. The control device 23 is used for receiving electrical energy from a power source and controlling a power supply to an electric load, such as coil 212, in order to allow the motor 2 and thus the blower 1 to be operated in a desired working condition.

To provide the blower 1 with good electromagnetic compatibility for a reliable operation, at least both the stator core 211 and the control device 23 have to be in a ground connection to a ground portion, in particular to the housing 4 of the blower 1.

According to one exemplary embodiment of the present invention, the stator core 211 forms a ground connection to a ground portion 231 of the control device 23 and/or the housing 4 via a ground pin 5 embedded in the stator core 211.

Figure 3:
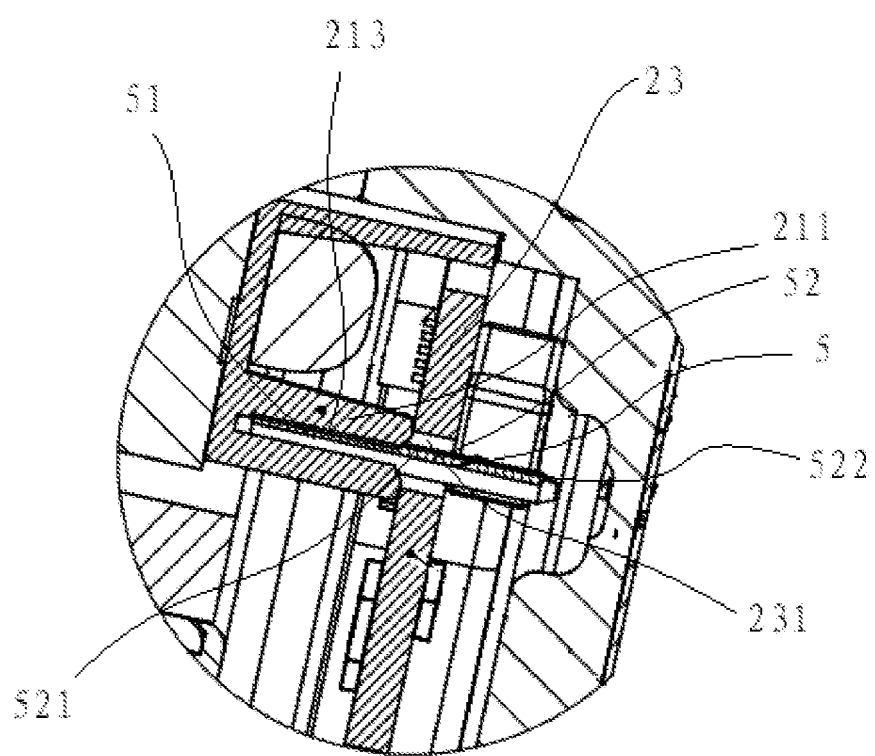
FIG. 3 shows an enlarged partial view of FIG. 2.

For a clearer view, FIG. 3 shows an enlarged partial view of a region G of FIG. 2. As shown in FIG. 3, an insertion hole 213 is formed inside the stator core 211, and a first portion 51 of the ground pin 5 can be inserted into the insertion hole 213 so as to be electrically connected to the stator core 211. Meanwhile, a second portion 52 of the ground pin 5 forms an electrical connection to the ground portion 231 of the control device 23 and/or the housing 4.

It is to be understood that the insertion hole is relatively small in size so as to avoid any noticeable adverse effect on the operation of the motor 2.

Preferably, the ground pin 5 forms an electrical connection to the ground portion 231 of the control device 23 particularly as a circuit board and the housing 4 simultaneously, that is to say, the stator core 211 and the control device 23 are placed into a ground connection at the same time by the ground pin 5.

According to one exemplary embodiment of the present invention, the first portion 51 of the ground pin 5 is embedded into the insertion hole 213 by an interference fit so that the ground pin 5 can be electrically connected to the stator core 211 in a simple and reliable manner, and no detachment will occur even in case of violent vibrations caused by operation of the blower 1.

Under such a condition, the first portion 51 of the ground pin 5 can be conically formed for the convenience of insertion of the first portion 51 of the ground pin 5 into the insertion hole 213, or the insertion hole 213 may also be configured to be conical.

For persons skilled in the art, both the first portion 51 of the ground pin 5 and the insertion hole 213 can be conically configured. Obviously, the shape and structure of the first portion 51 of the ground pin 5 and the insertion hole 213 are not thereby limited, as long as the first portion 51 of the ground pin 5 can be stably embedded into the insertion hole 213 to form a stable electrical contact with the insertion hole 213. In some circumstances, additional measures such as fusion solders may also be employed to guarantee a stable electrical contact therebetween.

According to one exemplary embodiment of the present invention, the second portion 52 of the ground pin 5 comprises a first section 521 in electrical connection with the ground portion 231 of the control device 23 and a second section 522 in electrical connection with the housing 4.

As shown in FIG. 3, the ground portion 231 of the control device 23 may be configured as a through hole, through which the first section 521 of the second portion 52 of the ground pin 5 in an assembled state passes to electrically contact the through hole. For example, the first section 521 of the second portion 52 of the ground pin 5 in the assembled state can be located in the through hole by an interference fit. Of course, the first section 521 of the second portion 52 of the ground pin 5 can also be electrically connected to the ground portion 231 of the control device 23 by means of welding or said electrical connection is merely additionally strengthened by means of welding.

The second section 522 of the second portion 52 of the ground pin 5 may be electrically connected to the housing 4 directly or indirectly. The present invention has no intention of putting any limitations thereto, for example, the second section 522 of the second portion 52 of the ground pin 5 can be electrically connected to other components that are in electrical connection to the housing 4 so as to realize an electrical connection to the housing 4 as well.

According to one exemplary embodiment of the present invention, the ground pin 5 is configured as a straight pin for the convenience of assembly, in which case the ground pin 5 itself can be easily manufactured and formed.

According to one exemplary embodiment of the present invention, the ground pin 5 may be fully or partially made of electrically conductive materials, such as metal, as long as it enables a ground connection, for example electrical connection to the housing 4, of both the stator core 211 and the control device 23 in the assembled state.

Figure 4:
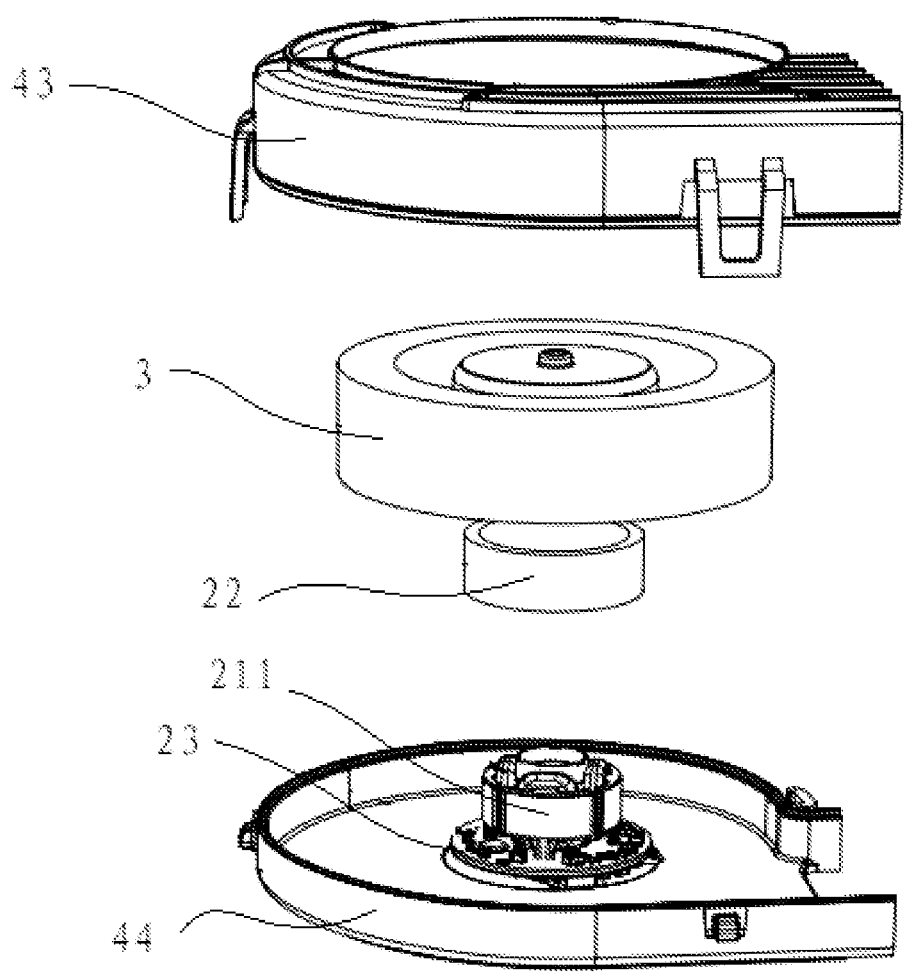
FIG. 4 shows an exploded view of main components of a blower according to one exemplary embodiment of the present invention.

FIG. 4 shows an exploded view of main components of a blower 1 according to one exemplary embodiment of the present invention. As shown in FIG. 4, the housing 4 comprises a first housing portion 43 and a second housing portion 44, which are assembled to form the housing 4 preferably by snap-fit joint. Preferably, the ground pin 5 is electrically connected to the second housing portion 44; therefore, the second housing portion 44 is preferably made of metal, and the first housing portion 43 may be made of any suitable materials.

For persons skilled in the art, although a blower is described above as an example, the technical idea of the present invention is not limited to blowers but rather applicable to any motors or devices comprising a motor.

Although some specific embodiments of the present application are described in detail herein, they merely serve as an explanation, rather than limitation to the scope of the present invention. Various types of substitutions, alterations and modifications can be conceived on condition that they do not deviate from the spirit or scope of the present invention.

The invention claimed is:

1. A blower comprising:
 a motor comprising:
  an at least partially electrically conductive housing;
  a control device comprising a ground portion;
  a stator comprising a stator core;
  a rotor; and
  a ground pin for at least achieving a ground connection of the stator core, the ground pin comprising:
   a first portion partially embedded in the stator core; and
   a second portion electrically connected with the ground portion of the control device and/or the at least partially electrically conductive housing;
  wherein the ground pin is electrically connected to the stator core by being partially embedded in the stator core; and
  wherein the ground pin is completely contained within the at least partially electrically conductive housing.

2. The blower according to claim 1, wherein an insertion hole is formed inside of the stator core, and the first portion of the ground pin is inserted into the insertion hole to be electrically connected to the stator core.

3. The blower according to claim 2, wherein the first portion of the ground pin is fitted into the stator core in an interference fit.

4. The blower according to claim 3, wherein the first portion of the ground pin and/or the insertion hole is at least partially conical.

5. The blower according to claim 4, wherein the second portion of the ground pin comprises a first section for electrical connection with the ground portion of the control device and a second section for electrical connection with the at least partially electrically conductive housing; and/or the ground pin is configured as a straight pin; and/or the control device is configured as a printed circuit board assembly.

6. The blower according to claim 5, wherein the ground portion of the control device is configured as a through hole, and in an assembled state, the first section is located in the through hole so as to be electrically connected to the through hole.

7. The blower according to claim 6, wherein the first section is located in the through hole with an interference fit.

8. The blower according to claim 6, wherein the first section is located in the through hole additionally by welding.

9. The blower according to claim 8, wherein the at least partially electrically conductive housing is fabricated from metal, and the second portion of the ground pin is electrically connected with the ground portion of the control device and the at least partially electrically conductive housing.

10. The blower according to claim 9, wherein the control device is annular having a central axis coaxial with a central axis of the stator.

11. The blower according to claim 10, wherein the stator is concentrically located within the rotor.

12. The blower according to claim 11, wherein the blower is a radial blower.

13. A blower comprising:
a motor comprising:
- an at least partially electrically conductive housing;
- a printed circuit board assembly comprising a ground portion;
- a stator comprising a stator core having an insertion hole formed therein;
- a rotor; and
- a ground pin for at least achieving a ground connection of the stator core, the ground pin comprising:
  - a first portion partially embedded in the insertion hole of the stator core in an interference fit, and
  - a second portion comprising:
    - a first section for electrical connection with the ground portion of the printed circuit board assembly, and
    - a second section for electrical connection with the at least partially electrically conductive housing;

wherein the ground pin is electrically connected to the stator core by being partially embedded in the stator core; and wherein the ground pin is completely contained within the at least partially electrically conductive housing.

14. The blower according to claim 13, wherein the first portion of the ground pin and/or the insertion hole is at least partially conical.

15. The blower according to claim 14, wherein the ground portion of the control device is configured as a through hole, and in an assembled state, the first section is located in the through hole so as to be electrically connected to the through hole with an interference fit.

16. The blower according to claim 15, wherein the first section is located in the through hole additionally by welding.

17. The blower according to claim 16, wherein the control device is annular having a central axis coaxial with a central axis of the stator.

18. The blower according to claim 17, wherein the stator is concentrically located within the rotor.

19. The blower according to claim 18, wherein the blower is a radial blower.

* * * * *